United States Patent
Ukai et al.

(10) Patent No.: US 7,328,367 B2
(45) Date of Patent: Feb. 5, 2008

(54) LOGICALLY PARTITIONED COMPUTER SYSTEM AND METHOD FOR CONTROLLING CONFIGURATION OF THE SAME

(75) Inventors: Toshiyuki Ukai, Machida (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 528 days.

(21) Appl. No.: 10/339,337

(22) Filed: Jan. 10, 2003

(65) Prior Publication Data
US 2004/0003319 A1 Jan. 1, 2004

(30) Foreign Application Priority Data
Jun. 27, 2002 (JP) .............................. 2002-187262

(51) Int. Cl.
*G06F 11/00* (2006.01)
(52) U.S. Cl. .................................. 714/7; 714/13; 718/1
(58) Field of Classification Search .................. 714/13, 714/7; 718/1
See application file for complete search history.

(56) References Cited

U.S. PATENT DOCUMENTS

| | | | | |
|---|---|---|---|---|
| 5,345,590 A | | 9/1994 | Ault et al. | |
| 5,828,583 A | * | 10/1998 | Bush et al. | 702/185 |
| 6,629,266 B1 | * | 9/2003 | Harper et al. | 714/38 |
| 6,634,001 B2 | * | 10/2003 | Anderson et al. | 714/38 |
| 6,859,889 B2 | * | 2/2005 | Matsuura et al. | 714/7 |
| 6,901,582 B1 | * | 5/2005 | Harrison | 717/127 |
| 6,978,398 B2 | * | 12/2005 | Harper et al. | 714/13 |
| 2002/0162049 A1 | * | 10/2002 | Takamoto et al. | 714/12 |

FOREIGN PATENT DOCUMENTS

| | | |
|---|---|---|
| JP | 1-224846 | 3/1988 |
| JP | 5-165798 | 12/1991 |
| JP | 11-65869 | 8/1997 |
| JP | 2001-34495 | 7/1999 |

* cited by examiner

*Primary Examiner*—Robert W. Beausoliel
*Assistant Examiner*—Philip Guyton
(74) *Attorney, Agent, or Firm*—Reed Smith LLP; Stanley P. Fisher, Esq.; Juan Carlos A. Marquez, Esq.

(57) ABSTRACT

High reliability is achieved using logical computers without having to provide logical computers for a standby system in advance. By monitoring a status of an active system to predict failures, standby logical computers are newly created to switch logical computers running the system.

18 Claims, 12 Drawing Sheets

MONITORING DATA TABLE

| # | MONITORING DATA | |
|---|---|---|
| 1 | /var/log/messages | 301 |
| 2 | /var/log/crit_log | |
| 3 | /var/log/err_log | |
| 4 | /usr/local/smb/log.smb | |
| 5 | /usr/local/smb/log.nmb | |
| 6 | /usr/local/apc/access_log | |
| 7 | /usr/local/apc/error_log | |

FIG. 5

FAILURE PREDICTION LEVEL DEFINITION TABLE

| FAILURE PREDICTION LEVEL | THRESHOLD OF FAILURE PREDICTION DETERMINATION | | | SWITCHING REQUIRED OR NOT | CONDITION |
|---|---|---|---|---|---|
| | TOTAL ACCUMULA-TION COUNT | ACCUMULATION WITHIN UNIT TIME | | | |
| | | UNIT TIME | COUNT | | |
| 1 | 1 | 0 | 0 | REQUIRED | NONE (CONDITIONS ARE ALWAYS SATISFIED) |
| 2 | 10 | 1 hour | 5 | REQUIRED | PREDETERMINED TIME AFTER NOTIFICATION TO MANAGER |
| 3 | 100 | 1 min. | 10 | REQUIRED | OBTAIN APPROVAL OF MANAGER |
| 4 | 100 | 1 min. | 10 | NOT REQUIRED | (RECOMMEND MANAGER TO MAKE SWITCHING) |

FIG. 7

STATUS MANAGEMENT TABLE FOR
FAILURE PREDICTION DETERMINATION

| EVENT | DETERMINATION ITEMS | | | FAILURE PREDIC- TION LEVEL | STATUS OF DETERMINATION ITEMS | | |
|---|---|---|---|---|---|---|---|
| | FACIL- ITY | PRIOR- ITY | MESSAGE | | TOTAL OCCUR- RENCE COUNT | OCCURRENCE COUNT WITHIN PREDETERMINED PERIOD | OCCURRENCE TIME MANAGE- MENT TABLE |
| 1 | * | EMERGE | * | 1 | 0 | 0 | NULL |
| 2 | * | ALERT | * | 1 | 0 | 0 | NULL |
| 3 | * | * | Device error | 2 | 1 | 1 | ●→ |
| 4 | * | * | Device error | 3 | 1 | 0 | ●→ |
| 5 | KERN | CLIT | Check condition | 2 | 5 | 3 | ●→ |
| 6 | * | CLIT | * | 4 | 2 | 1 | ●→ |

OCCURRENCE TIME MANAGEMENT TABLE

| | |
|---|---|
| NUMBER OF SLOTS WITHIN TABLE (n) | 801 |
| NEWEST DATA SLOT NUMBER | 802 |
| OLDEST DATA SLOT NUMBER | 803 |
| SLOT #0 | 804 |
| SLOT #1 | |
| SLOT #2 | |
| : | |
| SLOT # (n-1) | |

FIG. 11

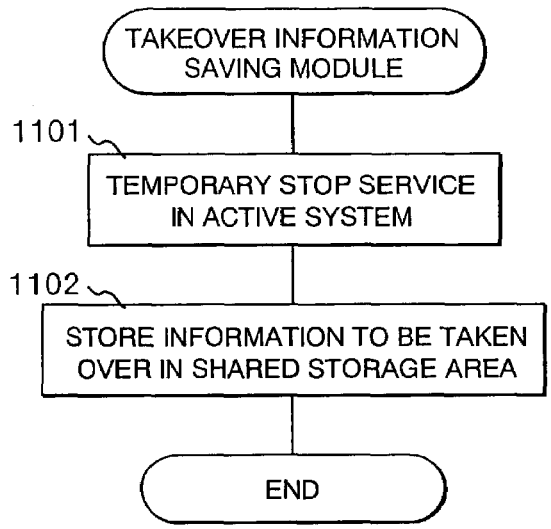

FIG. 12

FAILURE PREDICTION LEVEL DEFINITION TABLE

| FAILURE PREDICTION LEVEL | THRESHOLD OF FAILURE PREDICTION DETERMINATION / LOGICAL COMPUTER OPERATING TIME | SWITCHING REQUIRED OR NOT | CONDITION |
|---|---|---|---|
| 1 | -1 (NO DETERMINATION) | REQUIRED | NONE (CONDITIONS ARE ALWAYS SATISFIED) |
| 2 | 20 DAYS | REQUIRED | PREDETERMINED TIME AFTER NOTIFICATION TO MANAGER |
| 3 | 15 DAYS | REQUIRED | OBTAIN APPROVAL OF MANAGER |
| 4 | 10 DAYS | NOT REQUIRED | (RECOMMEND MANAGER TO MAKE SWITCHING) |

FIG. 13

FAILURE PREDICTION LEVEL DEFINITION TABLE

| FAILURE PREDICTION LEVEL | THRESHOLD OF FAILURE PREDICTION DETERMINATION | | SWITCHING REQUIRED OR NOT | CONDITION |
|---|---|---|---|---|
| | SERVICE COUNT OF AP#m | AVERAGE RESPONSE TIME OF AP#m | | |
| 1 | 500,000 | 10 SECONDS | REQUIRED | NONE (CONDITIONS ARE ALWAYS SATISFIED) |
| 2 | 300,000 | 5 SECONDS | REQUIRED | PREDETERMINED TIME AFTER NOTIFICATION TO MANAGER |
| 3 | 200,000 | 3 SECONDS | REQUIRED | OBTAIN APPROVAL OF MANAGER |
| 4 | 100,000 | 2 SECONDS | NOT REQUIRED | (RECOMMEND MANAGER TO MAKE SWITCHING) |

FIG. 14

STATUS MANAGEMENT TABLE FOR
FAILURE PREDICTION DETERMINATION

| EVENT | EVALUATION ITEM (701) | SWITCHING LEVEL (703) | STATUS OF EVALUATION ITEM (704) |
|---|---|---|---|
| 1 | LOGICAL COMPUTER OPERATING TIME | 2, 3, 4 | 10 DAYS |
| 2 | SERVICE COUNT OF AP#1 | 3, 4 | 5112 TIMES |
| 3 | AVERAGE RESPONSE TIME OF AP#1 | 1, 2, 3, 4 | 500 MILLISECONDS |
| 4 | SERVICE COUNT OF AP#2 | — | — |
| 5 | AVERAGE RESPONSE TIME OF AP#2 | — | — |
| 6 | SERVICE COUNT OF AP#3 | — | — |
| 7 | AVERAGE RESPONSE TIME OF AP#3 | — | — |
| 8 | SERVICE COUNT OF AP#4 | 4 | 21,982 TIMES |
| 9 | AVERAGE RESPONSE TIME OF AP#4 | 4 | 2 SECONDS |

FIG. 15

LOGICAL COMPUTER CONFIGURATION
INFORMATION TABLE

| LOGICAL COMPUTER | CONFIGURATION INFORMATION (ASSIGNMENT OF PHYSICAL RESOURCES) | | | | SWITCHING PRIORITY |
|---|---|---|---|---|---|
| | PROCESSOR | MEMORY | DISK | NETWORK | |
| 0 | ... | ... | ... | ... | 3 |
| 1 | ... | ... | ... | ... | 1 |
| 2 | ... | ... | ... | ... | 4 |
| 3 | ... | ... | ... | ... | 2 | ns
LOGICALLY PARTITIONED COMPUTER SYSTEM AND METHOD FOR CONTROLLING CONFIGURATION OF THE SAME

BACKGROUND OF THE INVENTION

1. Field of the Invention

The present invention relates to an increase in reliability against failures in a system using logical computers.

2. Description of the Prior Art

The advance of processor technology has enabled high-performance processors to be easily used. Conventionally, insufficient performance has been covered by running plural logical computers in parallel. With the advent of high-performance processors, however, performance has been satisfied and concerns are shifting to how to effectively use the high-performance processors. A logical computer function is one approach to the effective use of the high-performance processors. The logical computer function is technology for creating plural virtual computers from one physical computer.

For example, by assigning one physical processor to plural logical computers in a timesharing mode, software running on the logical computers can operate as if different physical computers existed. This function allows effective use of one high-performance physical processor. There is an example that further develops the logical computer function to provide higher reliability.

In U.S.005345590A, a method is described which builds a hot standby with two logical computers, and when one of them fails, switches to another logical computer to continue processing. The hot standby method is a method for achieving high reliability normally with different computers. According to this technology, two different computers are provided so that processing is normally performed by one computer, and if a failure occurs, switching is made to another standby computer without stopping processing. In U.S.005345590A, a hot standby is built between two logical computers created on an identical physical computer. This contributes to an increase in reliability of system level.

In Japanese Patent Laid-Open No. 2001-34495, a description is made of technology for preventing abnormal termination of processing of a duplexed processing device due to system switching by the saving of execution statuses and system switching based on predictions on failures of the processing device. There is such technology for predicting failures at hardware level.

In the U.S.005345590A, a description is made of a method which increases reliability by building a hot standby with two logical computers. According to this method, since standby logical computers are provided in advance for hot standby, computer resources are consumed for unpredictable failures.

In Japanese Patent Laid-Open No. 2001-34495, a description is made of a method for changing the operation of a duplexed device. According to this method, although failures are predicted, the device is assumed to be duplexed, and still computer resources are consumed.

SUMMARY OF THE INVENTION

To solve the above-described problem, in logical computers using a computer comprising at least one physical processor, means for predicting failures of a logical computer under operation is provided, and a standby logical computer is created based on failure prediction, and switching is made to a standby logical computer before a failure occurs.

BRIEF DESCRIPTION OF THE DRAWINGS

FIG. 5 is a diagram showing a failure prediction level definition table in the first embodiment of the present invention;

FIG. 7 is a diagram showing a status management table for failure prediction determination in the first embodiment of the present invention;

FIG. 8 is a diagram showing an occurrence time management table in the first embodiment of the present invention;

FIG. 11 is a diagram showing a flow of a take-over information saving module in the first embodiment of the present invention;

FIG. 12 is a diagram showing a failure prediction level definition table in a second embodiment of the present invention;

FIG. 13 is a diagram showing a failure prediction level definition table in the second embodiment of the present invention;

FIG. 14 is a diagram showing a management table for failure prediction determination in the second embodiment of the present invention; and FIG. 15 is a diagram showing a logical computer configuration information table in an embodiment of the present invention.

DETAILED DESCRIPTION OF PREFERRED EMBODIMENTS

First Embodiment

Hereinafter, a first embodiment of a method for achieving a highly reliable multiple system according to the present invention will be described in detail with reference to the drawings.

Figure 1:
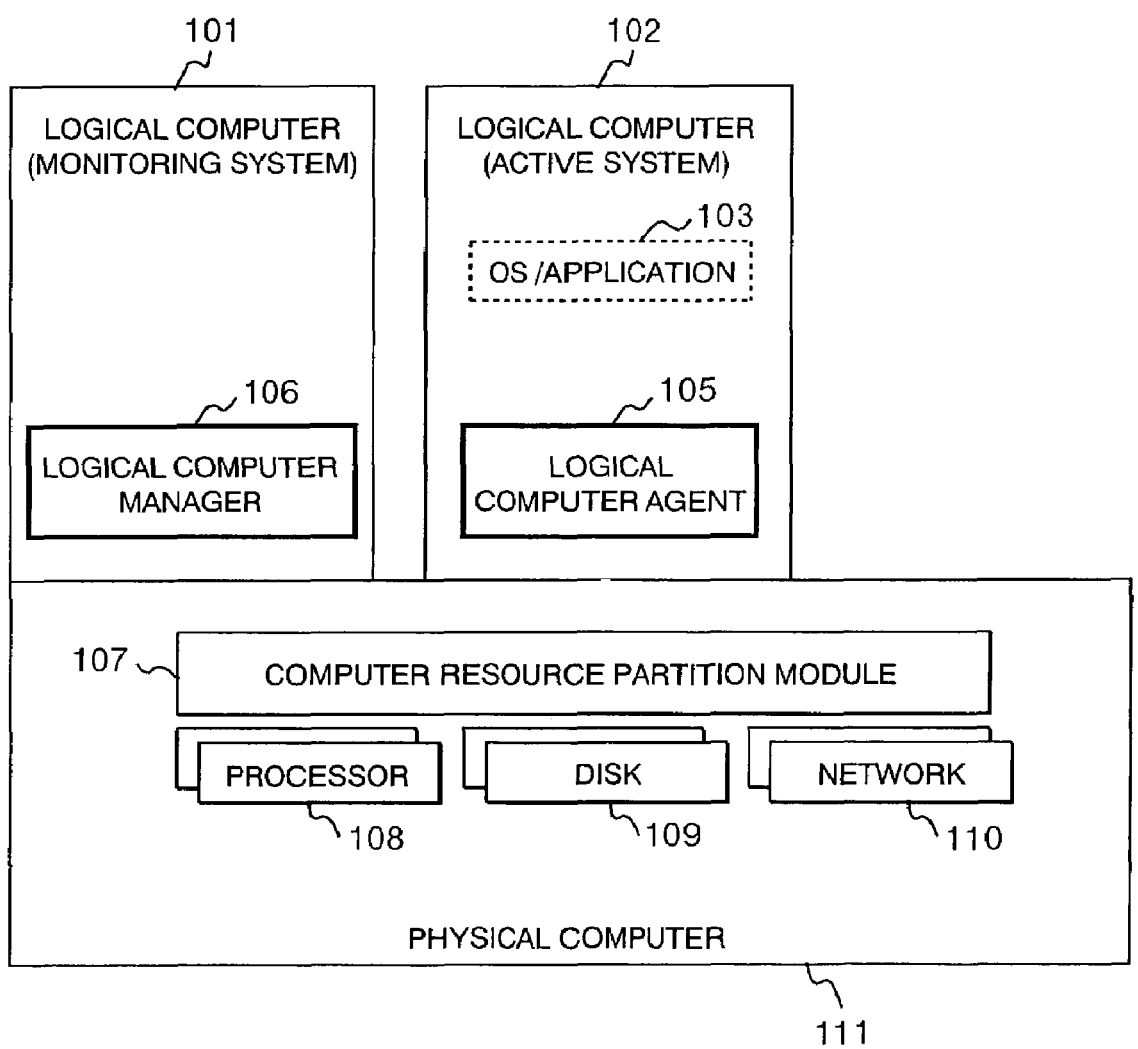
FIG. 1 is a diagram showing an overall configuration in a first embodiment of the present invention.

FIG. 1 shows a schematic diagram of a method for achieving a highly reliable multiple system according to the present invention. The reference numerals 101 and 102 indicate logical computers, respectively, and 111 indicates a physical computer. The physical computer 111 comprises a physical processor 108, a disk unit 109, a network device 110, and a computer resource partitioning module 107.

The logical computers 101 and 102 are virtual computers created from resources of the physical computer 111. Although not shown, plural logical computers of active systems are generally created. That is, generally, one monitoring system is provided for plural active systems. Each of the processor 108, disk unit 109, network device 110 possessed by the physical computer 111 is split for assignment to the logical computers 101 and 102. By this arrangement, software 103 such as an operating system (OS) and applications running on the logical computers 101 to 102 can operate as if there were physical computers different from each other. Specifically, the processor and the network are assigned to the logical computers in a timesharing mode, and the disk unit and memory are split for assignment. This function is implemented by the computer resource partitioning module 107. In this embodiment, a logical computer manager 106 is added to the logical computer 101 and a logical computer agent 105 is added to the logical computer 102 to make the software 103 running on the logical computer 102 more reliable.

Figure 2:
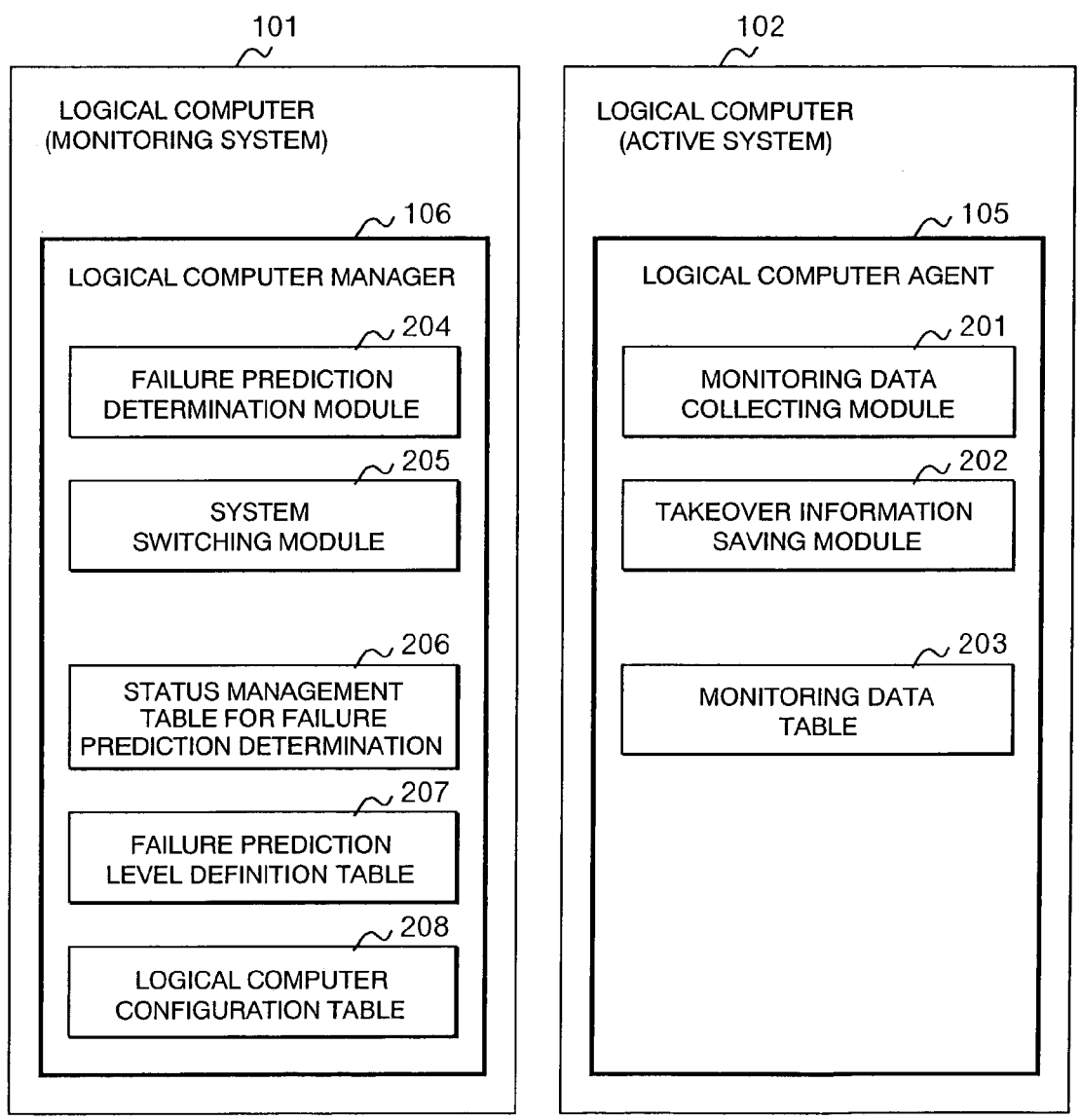
FIG. 2 is a diagram showing the configurations of a logical computer manager and a logical computer agent in the first embodiment of the present invention.

FIG. 2 shows the configurations of the logical computer manager 106 and the logical computer agent 105 for achieving this method. The logical computer agent 105 comprises a monitoring data collecting module 201, a take-over information saving module 202, and a monitoring data table 203. The logical computer manager 106 comprises a failure prediction determination module 204, a system switching module 205, a status management table 206 for failure prediction determination, a failure prediction level definition table 207, and a logical computer configuration table 208.

The monitoring data table 203 contains data used for failure prediction. The status management table 206 for failure prediction determination contains information used to evaluate failure levels of events that occurred. The failure prediction level definition table 207 contains definitions for evaluating the levels of predicted failures. The logical computer configuration table 208 describes resources assigned to plural logical computers and information used for failure prediction determination.

The monitoring data collecting module 201 collects data to be monitored. The take-over information saving module 202 saves information to be taken over by a standby logical computer in a logical computer in which a failure is predicted. The failure prediction determination module 204 analyzes data to be monitored and predicts a failure. The system switching module 205, when a failure is predicted in a logical computer, switches the operating logical computer system to a standby logical computer system.

Figures 3, 4:
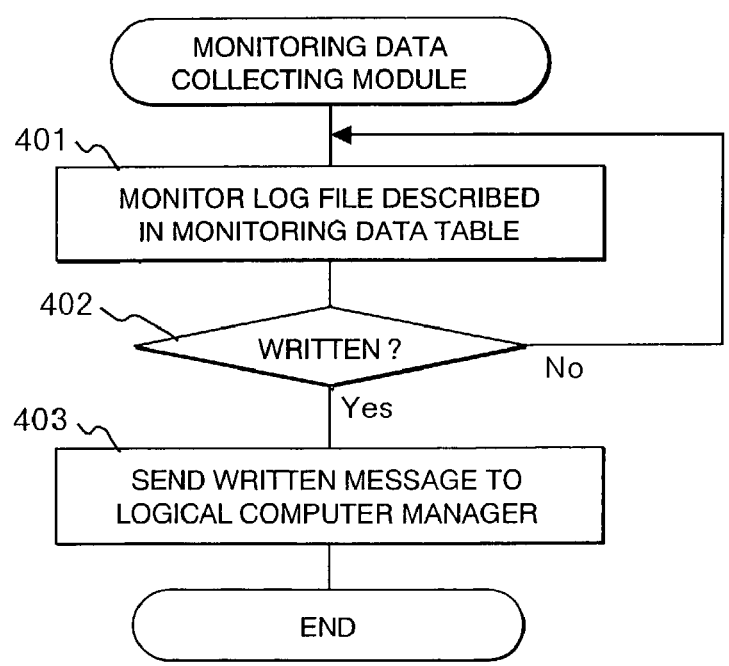
FIG. 3 is a diagram showing a monitoring data table in the first embodiment of the present invention.
FIG. 4 is a diagram showing a flow of a monitoring data collecting module in the first embodiment of the present invention.

FIG. 3 shows the monitoring data table 203. This table contains the file names to which data (log) used for failure prediction is outputted. Log files are basically outputted by system logs. The system log function is implemented in such a way that a daemon program syslogd receives log messages outputted by a kernel, daemons, and various applications and programs and outputs them to log files, console, and the like. Since files to which logs are outputted by the system log function can be freely set by a system manager, data to be monitored is specified by indicating an output file name in the column of monitoring data 301 of the monitoring data table. Some applications create log files with their unique mechanism. They also register log files to be monitored in the monitoring data table.

FIG. 4 shows a flow of the monitoring data collecting module 201. Step 401 monitors monitoring data (log files) registered in the monitoring data table 203. If step 402 determines that writing is made to the monitoring data 301, step 403 sends a written message to the logical computer manager 106. Not all the written message needs to be sent; for example, only determination items used for failure prediction in the status management table 206 to be described later (FIG. 7) for failure prediction determination may be sent. In this case, a table corresponding to the status management table 206 for failure prediction determination in which the determination items are contained must be placed in the logical computer agent 105. Some modules for outputting system logs and other logs have a function for outputting logs to other hosts connected to a network according to descriptions of a configuration definition file or the like. A module for sending the logs to the logical computer manager 106 may be achieved using this function.

FIG. 5 shows the failure prediction level definition table 207. This table describes conditions (threshold) for determining whether to switch to a new logical computer for each of failure prediction levels read from FIG. 7 (to be described in FIG. 7) and operations (switching required or not) to be performed when the thresholds are reached. Column 501 describes failure prediction levels, and column 502 describes conditions in which it is determined that the failure prediction levels are reached. In this embodiment, as thresholds used for failure prediction determination at the occurrence of events, total accumulation counts (column 503) and accumulation counts within unit time (column 504) are managed. Operations (switching required or not) when thresholds of failure prediction determination described in column 502 are exceeded are shown in column 505, and conditions for performing the operations are shown in column 506. For example, for failure prediction level 3, if an event occurs once, switching is unconditionally performed. For failure prediction level 1, if a event occurs more than a total of 100 times, or if it occurs 10 times a minute, switching is performed after approval of the manager. For failure prediction level 4, if an event occurs more than a total of 100 times, or if it occurs 10 times a minute, the manager is recommended to make switching (by mail or the like), but switching itself is not performed.

Figure 6:
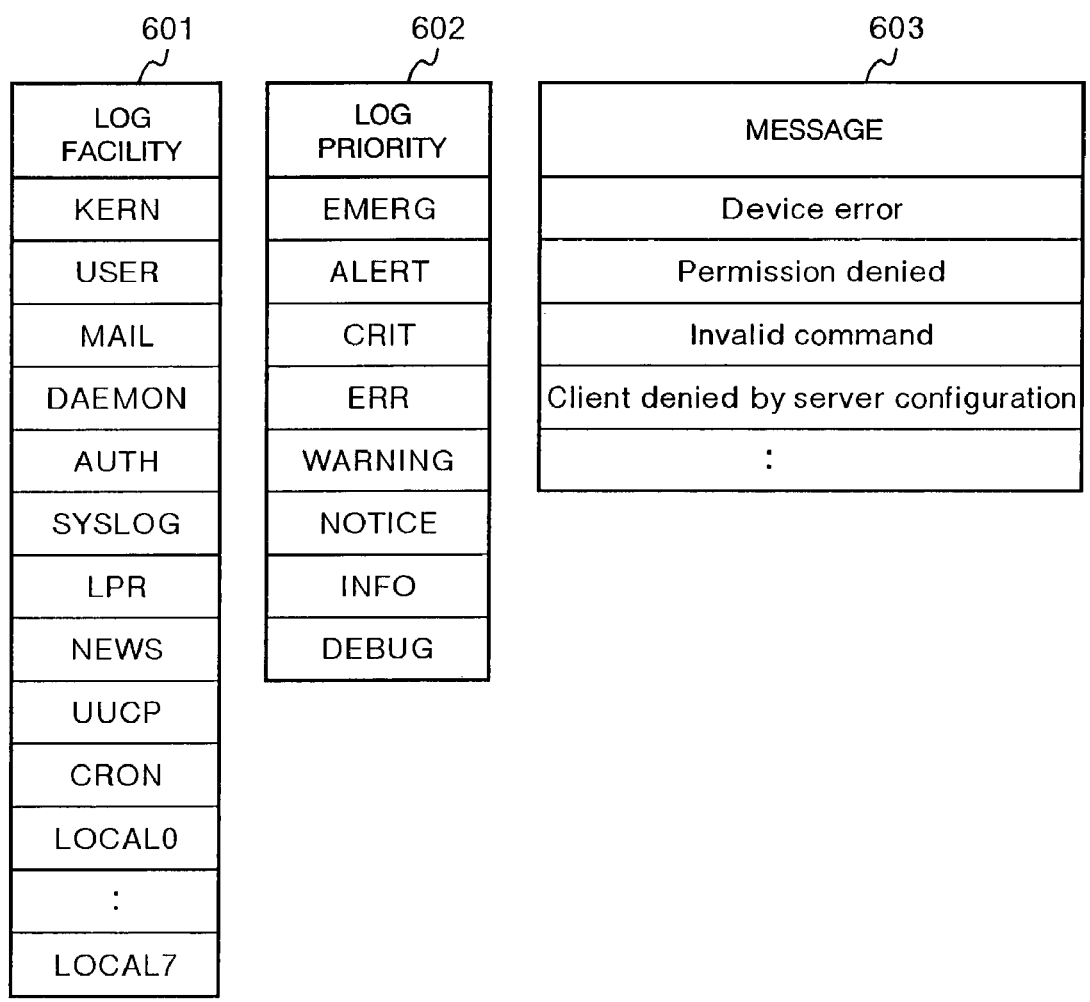
FIG. 6 shows items for determining failure prediction in the first embodiment of the present invention.

FIG. 6 shows items for determining failure prediction used in this embodiment. Here, system logs are exemplified. System logs have two concepts: facility of column 601 and priority of column 602. Facility represents the types of system logs. Priority represents priority levels; higher portions of the table indicate higher priorities. The types of system logs are specified by combining the facility and priority. The types and messages as shown in column 603 are outputted in combination.

FIG. 7 shows a status management table for failure prediction determination. This table shows failure prediction levels at the occurrence of events to be determined and current statuses (occurrence statuses) of the events. Column 701 indicates evaluation items. Its contents are combinations of items for determining failure prediction shown in FIG. 6. Column 702 indicates combinations of facility, column 703 indicates combinations of priority, and column 704 indicates combinations of message. "*" in an item of column 701 indicates that the item is irrelevant. In other words, for event 1, the item is true for all log messages of priority 703. Column 705 indicates a failure prediction level (defined in the failure prediction level definition table 207) when an event shown in column 701 occurs. Column 706 indicates the status (occurrence status) of a determination item. In this embodiment, column 707 holds the total number of occurrences, and column 708 holds the total number of occurrences within a predetermined period (unit time set according to failure prediction levels in the failure prediction level definition table of FIG. 5). To obtain the total number of occurrences within a predetermined period of column 708, it is necessary to record event occurrences in time series. Accordingly, column 709 contains a pointer to an occurrence time management table shown in FIG. 8 that manages the occurrence time of events in time series. An item of event 2 is set to a failure prediction level of 1 if a log message with priority of ALERT is outputted, and has a current total occurrence count of 0. According to the failure prediction level definition table of FIG. 5, for a failure prediction level of 1, if the event occurs even once, system switching is unconditionally performed. Accordingly, an occurrence count within a predetermined period of column 708 is not targeted for evaluation and therefore column 709 has no pointer to the occurrence time management table. Likewise, for events 3 and 4, when message contents are "Device error", the events are managed in both the failure prediction levels 2 and 3. In this case, since an occurrence count within predetermined period 708 is significant, the occurrence time management table is required and pointed to in column 709. Event 4 of FIG. 7 has a failure prediction level of 3 and event 6 has a failure prediction level of 4. Referring back to FIG. 5, the failure prediction levels 3 and 4 are the same in threshold of failure prediction determination but different in condition and switching required or not. This is because it is determined that the system becomes more unstable when "Device error" message is outputted 100 times than when priority CLIT occurs 100 times, as shown in FIG. 7.

FIG. 8 shows an example of the occurrence time management table pointed to from column 709 of FIG. 7. The occurrence time management table is provided independently for each of pointers of FIG. 7. The occurrence time management table comprises: a "number of slots within table" field 801 (the number of slots is n) that indicates the number of slots within the table; a "newest data slot number" field 802 that indicates a slot number in which the newest data is stored; an "oldest data slot number" field 803; and plural slots 804 for storing time information. The slot group 804 has a structure in which the occurrence time of events is stored in a wraparound fashion so that a slot of slot # (n-1) wraps around to slots #0. The oldest data slot number field 803 stores a slot number in which the oldest data retroactively generated within a unit time defined in the failure prediction level definition table (FIG. 5) is stored.

The occurrence time management table is managed in the following way. When an event to be stored in the occurrence time management table occurs, the occurrence time of the event is recorded in a slot of a next number of a slot indicated by the newest data slot number field 802. At this time, a slot number to be stored as the oldest data slot number is searched for and stored in the field 803. The number of slots from the oldest slot to the newest slot is stored in the column 708 of FIG. 7, and thus the updating of the occurrence time management table is terminated.

If the "number of slots within table" field 801 is set to be equal to a value indicated by an accumulation count within unit time in the failure prediction level definition table (FIG. 5), the oldest data slot number field 803 is not necessarily required. This is because time information to be recorded is compared with old time information to be overwritten, and if the former is greater than a unit time defined in the failure prediction level definition table (FIG. 5), it can be determined that the threshold is not exceeded; if smaller, it can be determined that the threshold is exceeded.

Figure 9:
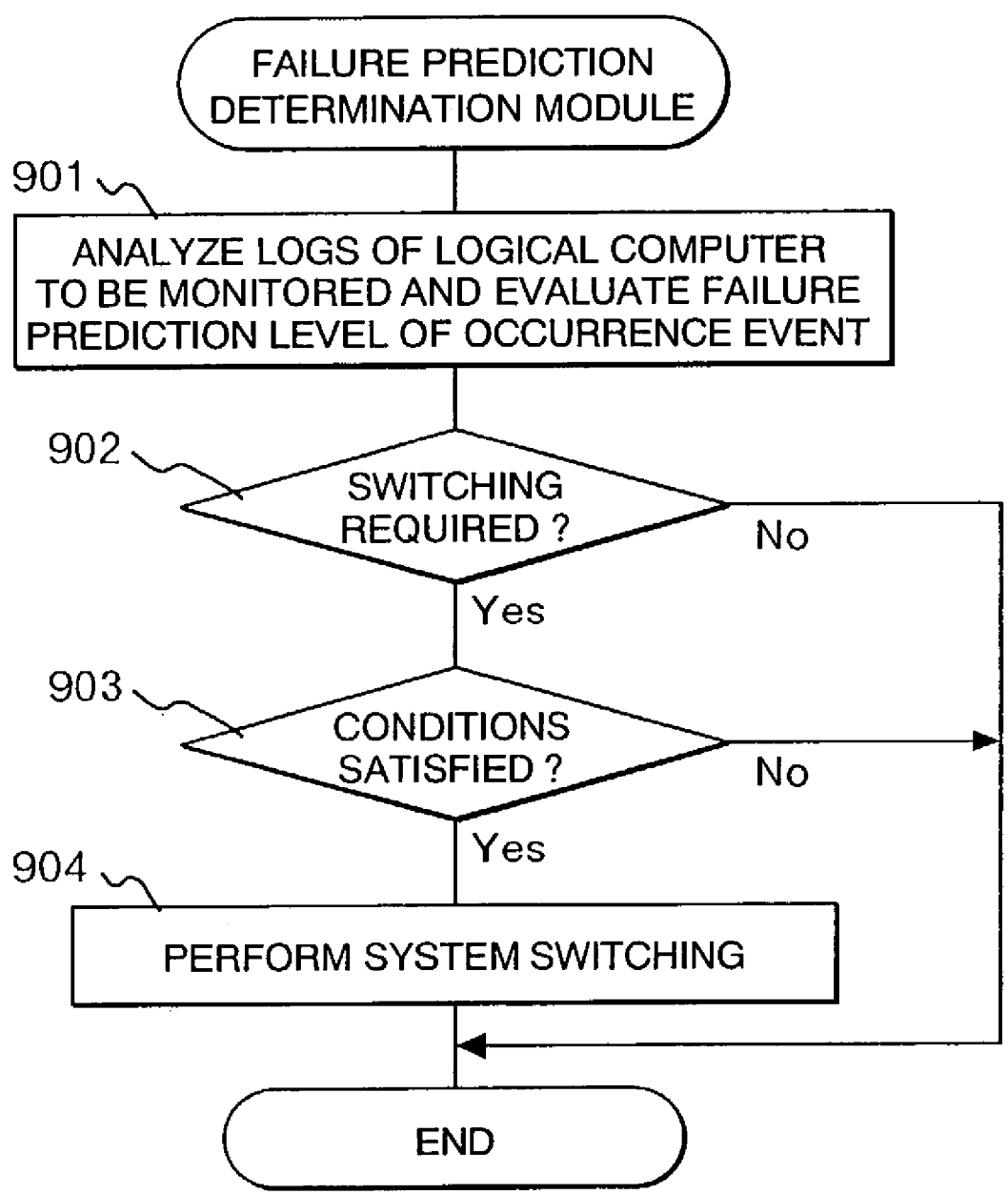
FIG. 9 is a diagram showing a flow of a failure prediction determination module in the first embodiment of the present invention.

FIG. 9 shows a flow of the failure prediction determination module 204. Step 901 analyzes logs of a logical computer to be monitored, and determines whether an event targeted for the determination items 701 of the status management table for failure prediction determination (FIG. 7) occurs. If the event is eligible for determination, step 901 refers to a failure prediction level (column 705) to obtain the failure prediction level of the event. For the obtained failure prediction level, thresholds of failure prediction determination (column 502) are obtained from the failure prediction level definition table (FIG. 5). In this embodiment, as thresholds of failure prediction determination, the total accumulation count (column 503) of the event or accumulation count (column 504) within unit time are used. Accordingly, in the status management table for failure prediction determination (FIG. 7), 1 is added to the total occurrence count (column 707) of the status of determination items (column 706) corresponding to the event that occurred. Furthermore, an occurrence time management table (FIG. 8) corresponding to the event is obtained from column 709, an accumulation count within a predetermined period is obtained according to the updating of the occurrence time management table as described in FIG. 8, and the value is stored in column 708. Step 902 determines whether switching is required (column 505), according to whether a total occurrence count (column 707) and/or occurrence count within a predetermined period are equal to or greater than the thresholds of the total accumulation count (column 503) and accumulation count within unit time (column 504) in the failure prediction level definition table (FIG. 5). If it is determined that switching is required, step 903 obtains a condition described in column 506 of the failure prediction level definition table (FIG. 5). An operation described in the condition is performed, and if the condition is satisfied, system switching of step 904 is performed. If the condition is not satisfied, processing is immediately terminated. If a response from the manager (obtaining an approval) is required as a condition, a proper timeout time is set. The failure prediction determination module does not always need to be run on a logical computer manager. Instead, failure prediction may be determined by the logical computer agent and the results may be sent to the logical computer manager.

Figure 10:
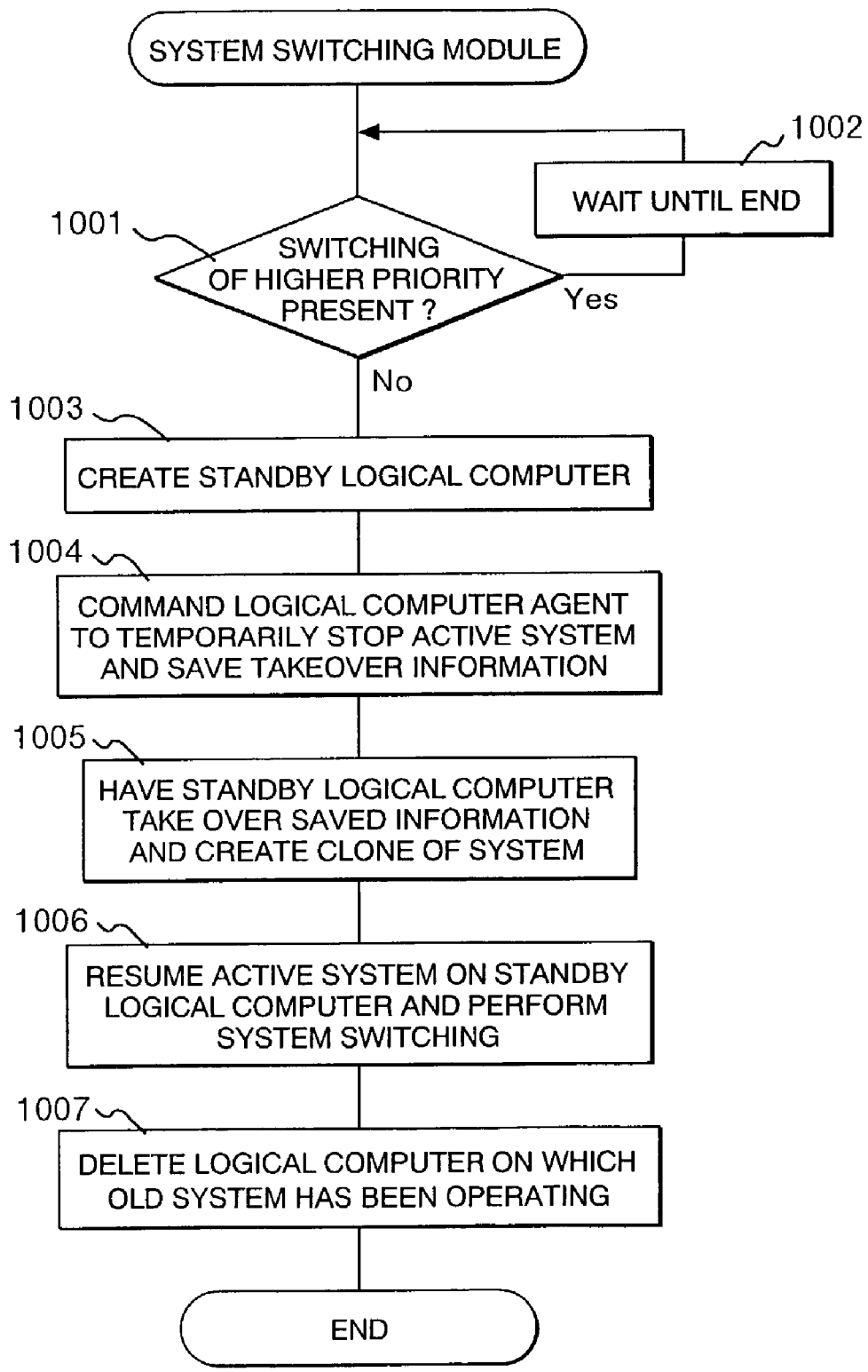
FIG. 10 is a diagram showing a flow of a system switching module in the first embodiment of the present invention.

FIG. 10 shows a flow of the system switching module 205. Step 1001 determines a logical computer in which system switching is to be preferentially performed when events requiring system switching occur at the same time in plural logical computers. In this case, a higher priority may be assigned to a logical computer in which an event of a higher failure prediction level 705 in the status management table for failure prediction determination (FIG. 7) occurs, a different priority may be assigned to each of the logical computers, or priorities may be decided according to the importance of applications being executed. A description will be made later of an example of the logical computer configuration table added with logical computer switching priorities (FIG. 15). If a logical computer having a high system switching priority is present, step 1002 waits until switching of the logical computer terminates. If there is no other system switching of high priority, a new logical computer (standby system) is created in step 1003. When the standby logical computer has been created, control goes to step 1004. In step 1004, the logical computer manager commands the logical computer agent of a logical computer of switching source to temporarily stop the active system and save take-over information. Examples of take-over information include session information and shopping list information in Web service. In step 1005, the logical computer manager lets the newly created logical computer take-over information saved previously, and creates a clone (standby system) of the system. Step 1006 uses the standby system as an active system to resume service of the active system. Step 1007 deletes the logical computer having been used as the old active system and terminates processing.

FIG. 11 shows a flow of the take-over information saving module in a logical computer agent. Step 1101 stops service in an active system. Step 1102 stores information to be taken over in a shared storage area accessible from other logical computers, and terminates processing.

FIG. 15 shows a logical computer configuration information table. The logical computer configuration information table stores information about resources assigned to created logical computers (column 1502). In this embodiment, switching priority (column 1503) is added. According to the priorities, when failure prediction is made at the same time in plural logical computers, it is determined which logical computers are preferentially subjected to system switching. The switching priorities may be decided according to the importance of applications running on the logical computers.

The effect of this embodiment is that standby logical computers do not need to be created in advance and consequently computer resources can be effectively utilized with high reliability, because log messages outputted by an OS and applications are analyzed for failure prediction, and standby logical computers are newly created based on the results to make system switching. Also, since system switching can be made before a failure occurs, overhead yielded by system switching can be reduced. Since the need for switching, and switching conditions can be set for each of failure prediction levels, diversified operation modes can be supported.

The present invention is also applicable among plural servers connected to a network. The same effect is obtained, for example, by providing plural standby servers, and when a failure is predicted, selecting one replacement server from among the standby servers and replacing a server expected to fail by the replacement server.

Second Embodiment

Although, in the above-described embodiment, failures are predicted based on log messages outputted by an OS and applications, a failure prediction method will be described from a different standpoint in another embodiment.

FIG. 12 shows an example of a failure prediction level definition table used to predict failures by monitoring the operating time of logical computers. As the thresholds of failure prediction determination, the operating time of logical computers (column 1201) is set.

Prolonged operating time of computers and application programs may slow down processing and increase the possibility of system failures due to fragmentary management of computer resources and reduction in an available resource amount attributed to software bugs. This embodiment enables periodic system refresh in such a case.

Likewise, FIG. 13 shows an example of a failure prediction level definition table used to predict failures by monitoring the service contents of applications. As the thresholds of failure prediction determination, application service count (column 1301) and application average response time (column 1302) are set.

FIG. 14 shows an example of a status management table for failure prediction determination in the above-described examples of FIGS. 12 and 13. As evaluation items (column 701), logical computer operating time, and service count and average response time for each of applications (AP#1 to AP#4 in this embodiment) are used. In FIG. 14, plural switching levels (column 703) are set for each of events. This enables the operation of switching operations in stages for a certain event. Like the embodiment described previously, the status of evaluation item (column 704) describes a current status of each evaluation item. When the value of the status of evaluation item (column 704) becomes equal to or greater than the thresholds in the failure prediction level definition tables shown in FIGS. 12 and 13, an operation such as system switching is started as in the embodiment described previously.

The effect of this embodiment is that, by monitoring the operating time of logical computers and the service counts and average response time of applications, not only failures can be predicted but also reduction in service level can be predicted in advance, contributing to prevention of them.

The present invention makes it possible to increase the reliability of a system using plural logical computers without wastefully consuming system resources.

What is claimed is:

1. A logical computer system comprising:
    monitoring means for monitoring execution statuses of programs running on a first logical computer by receiving log data;
    prediction means for analyzing the log data to calculate a possibility of occurrence of a failure of the first logical computer; and
    switching means for creating a second logical computer by using a part of physical resources including a processor and a memory which the first logical computer is using, when the possibility exceeds a predetermined threshold, thereby switching the programs running from the first logical computer to the second logical computer before the occurrence of the failure.

2. The logical computer system according to claim 1, wherein said monitoring means monitor information outputted during program execution.

3. The logical computer system according to claim 2, wherein said prediction means have a status management table for failure prediction determination which sets failure prediction levels corresponding to possibilities of occurrence of a failure for plural specific combined events of information detected by said monitoring means.

4. The logical computer system according to claim 3, wherein said prediction means further have thresholds of occurrence counts of said events, used to determine whether to switch between logical computers for each of the failure prediction levels obtained from said status management table for failure prediction determination.

5. The logical computer system according to claim 4, wherein said prediction means further have conditions for switching between logical computers when said occurrence counts exceed said thresholds.

6. The logical computer system according to claim 1, wherein said monitoring means monitor information indicating abnormality on program execution.

7. The logical computer system according to claim 1, wherein the log data includes at least a combination of a log facility, a log priority, and an error message.

8. The logical computer system according to claim 7, wherein the log facility is a kernel, a user, a mail, a daemon, a system, a Line Printer Remote protocol (LPR), a news, a Unix to Unix CoPy (UUCP), or a crontab command (CRON).

9. A logical computer system comprising:
    monitoring means for monitoring execution statuses of programs running on a first logical computer by receiving log data;
    prediction means for analyzing the log data to calculate a possibility of occurrence of a failure of the first logical computer; and switching means for creating a second logical computer by using a part of physical resources which the first logical computer is using, when the possibility exceeds a predetermined threshold, thereby switching the programs running from the first logical computer to the second logical computer before the occurrence of the failure, wherein said monitoring means monitor response time in certain application programs.

10. A logical computer system comprising:

monitoring means for monitoring execution statuses of programs running on a first logical computer by receiving log data;

prediction means for analyzing the log data to calculate a possibility of occurrence of a failure of the first logical computer; and switching means for creating a second logical computer by using a part of physical resources which the first logical computer is using, when the possibility exceeds a predetermined threshold, thereby switching the programs running from the first logical computer to the second logical computer before the occurrence of the failure, wherein said monitoring means use statistical information accumulated according to operation of programs running on the logical computer.

11. A method for controlling a configuration of a logical computer system, comprising the steps of:

monitoring execution statuses of programs running on a first logical computer;

predicting a failure of the first logical computer by analyzing log data to calculate a possibility of occurrence of the failure of the first logical computer; and when a failure is predicted, creating a second logical computer by using a part of physical resources including a processor and a memory which the first logical computer is using, and switching the programs running from the first logical computer to the second logical computer before the occurrence of the failure.

12. The method for controlling a configuration of a logical computer system according to claim 11, wherein the execution statuses of programs running on the first logical computer are monitored by receiving the log data, and the failure is predicted as the possibility exceeds a predetermined threshold.

13. The method for controlling a configuration of a logical computer system according to claim 11, wherein the log data includes at least a combination of a log facility, a log priority, and an error message.

14. A configuration control software program of a logical computer system embedded in a storage medium, comprising:

a monitoring module for monitoring execution statuses of programs running on a first logical computer;

a prediction module for predicting a failure of the first logical computer by analyzing log data to calculate a possibility of occurrence of the failure of the first logical computer; and a switching module, when a failure is predicted, for creating a second logical computer by using a part of physical resources including a processor and a memory which the first logical computer is using, and switching the programs running from the first logical computer to the second logical computer before the occurrence of the failure.

15. The configuration control software program of a logical computer system according to claim 14, wherein the execution statuses of programs running on the first logical computer are monitored by receiving the log data, and the failure is predicted as the possibility exceeds a predetermined threshold.

16. The configuration control software program of a logical computer system according to claim 14, wherein the log data includes at least a combination of a log facility, a log priority, and an error message.

17. A logical computer system, comprising:

monitoring means for monitoring execution statuses of programs running on a first logical computer by receiving log data;

prediction means for analyzing the log data to calculate a possibility of occurrence of a failure of the first logical computer; and switching means for creating a second logical computer by using a part of physical resources which the first logical computer is using, when the possibility exceeds a predetermined threshold, thereby switching the programs running from the first logical computer to the second logical computer before the occurrence of the failure, wherein the log data includes at least a combination of a log facility, a log priority, and an error message, and the log priority is labeled as emergency, alerted, critical, error, warning, notice, information, or debug.

18. The logical computer system according to claim 7, wherein the error message is a device error, a permission denial, an invalid command, or a denial to a client by a server configuration.

* * * * *